July 6, 1926.
I. H. KENDALL
1,591,533
MECHANISM FOR STERILIZING RECEPTACLES
Original Filed April 11, 1922
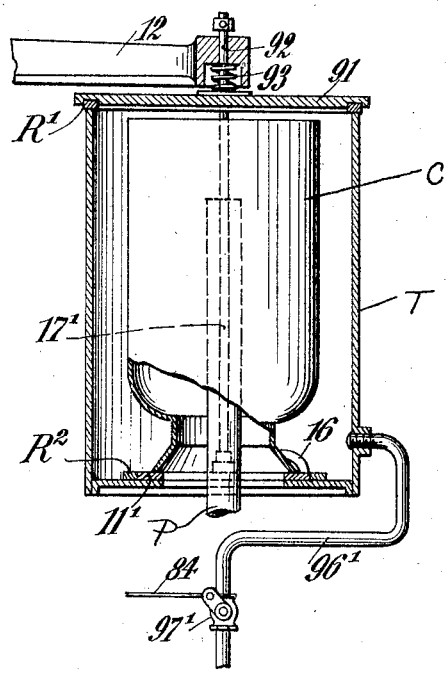
INVENTOR
Ira H. Kendall
BY Mock & Blum
ATTORNEYS Patented July 6, 1926.

1,591,533

UNITED STATES PATENT OFFICE.

IRA H. KENDALL, OF POTSDAM, NEW YORK.

MECHANISM FOR STERILIZING RECEPTACLES.

Original application filed April 11, 1922, Serial No. 551,570. Divided and this application filed August 21, 1925. Serial No. 51,631.

My invention relates to a new and improved method of and mechanism for causing a milk can or other receptacle to be thoroughly sterilized by raising it to a relatively high temperature by means of steam which may be of very low pressure.

Other objects of my invention will be set forth in the following description and drawing which illustrate a preferred embodiment thereof.

The drawing illustrates a sectional view partially in elevation.

This application is a division of my previously filed application Serial No. 551,570.

The can C may be mounted upon a support 11' connected to a turntable 12 or any other suitable conveyor.

The support 11' is provided with hooks 16 for holding the mouth of the can in position and rods 17' serve to connect the support 11' to the turntable 12. The turntable 12 is actuated so as to move the can downwardly into and upwardly out of a steam chamber T.

The steam chamber is provided with an annular bottom, the open center of which has a gasket $R^2$ secured thereto in any suitable manner. The turntable 12 has a cover 91 provided with another gasket R' tightly secured thereto and this cover 91 is secured to the turntable 12 by means of the pin 92 and the intermediate spring 93 which is relatively short and of considerable strength.

The apparatus is provided with an air pipe P which projects through the opening in the center of the bottom of the steam chamber and is connected to any suitable source of heated air or any suitable pump connected with a heater which can force heated air to it. When the can is placed in position the support fits tightly into the lower gasket $R^2$ and the top of the tank is sealed very tightly by the cover 91, having the gasket R'. At the same time the turntable 12 presses the cover 91 down with considerable force, the gasket R' being made somewhat resilient so that the parts do not become broken or worn out.

When the link 84 is operated so as to open the steam valve in casing 97', steam passes from any suitable source through pipe 96' and it cannot escape because of the gaskets R and R' and because the turntable 12 keeps the cover firmly in position. At the same time heated air is passed into the interior of the can through the pipe 17' and in a very short time the temperature of the can is sufficient to thoroughly sterilize it in all parts thereof.

After the steam is shut off and the cover 91 is removed, the cooling of the highly heated can might cause some steam to condense thereon so as to make it moist which is undesirable. Hence the powerful stream of heated air is forced into the interior of the can while it is being moved outside of the steam chamber and even after it passes completely out of the steam chamber and this heated air causes the can to be completely dried.

I have shown a preferred embodiment of my invention but it is clear that numerous changes and omissions could be made without departing from its spirit.

I claim:

1. In a machine for cleansing milk cans or other receptacles, the combination of a vessel having an open bottom provided with a gasket around the said opening, means for placing a can upon the said bottom in inverted position and adjacent the said gasket so that it tightly closes the said opening, means for closing the top of the said vessel and means for introducing steam under pressure into the interior thereof.

2. In a machine for cleansing milk cans or other receptacles, the combination of a vessel having an open bottom provided with a gasket around the said opening, means for placing a can upon the said bottom in inverted position and adjacent the said gasket so that it tightly closes the said opening, means for closing the top of the said vessel and means for introducing steam under pressure into the interior thereof, and means for simultaneously directing heated air into the interior of the said can.

In testimony whereof I affix my signature.

IRA H. KENDALL.